(12) United States Patent
Pittius et al.

(10) Patent No.: US 7,584,608 B2
(45) Date of Patent: Sep. 8, 2009

(54) HYDRODYNAMIC CLUTCH

(75) Inventors: Reinhold Pittius, Crailsheim (DE); Markus Kley, Ellwangen (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 274 days.

(21) Appl. No.: 11/568,489

(22) PCT Filed: Nov. 18, 2005

(86) PCT No.: PCT/EP2005/012341
§ 371 (c)(1), (2), (4) Date: Oct. 30, 2006

(87) PCT Pub. No.: WO2006/061092
PCT Pub. Date: Jun. 15, 2006

(65) Prior Publication Data
US 2008/0017465 A1    Jan. 24, 2008

(30) Foreign Application Priority Data
Dec. 10, 2004    (DE) .................. 10 2004 059 836

(51) Int. Cl.
*F16D 33/00* (2006.01)
(52) U.S. Cl. .......................... 60/337; 60/330
(58) Field of Classification Search ............ 60/330, 60/336, 337, 357, 364, 366
See application file for complete search history.

(56) References Cited
U.S. PATENT DOCUMENTS

| | | | |
|---|---|---|---|
| 2,240,650 A | | 5/1941 | Heyer |
| 3,399,533 A | * | 9/1968 | Becker .................. 60/336 |
| 3,405,524 A | * | 10/1968 | Nelden .................. 60/337 |
| 4,350,011 A | | 9/1982 | Rogner et al. |
| 4,773,513 A | | 9/1988 | Herrmann et al. |
| 4,970,860 A | | 11/1990 | Metzger et al. |
| 5,435,133 A | | 7/1995 | Schust et al. |

FOREIGN PATENT DOCUMENTS

| | | |
|---|---|---|
| CH | 264068 | 12/1949 |
| DE | 1 140 595 | 6/1963 |
| DE | 1 196 441 | 7/1965 |
| DE | 29 18 284 | 11/1979 |
| DE | 32 40 179 | 6/1983 |
| DE | 32 33 567 | 3/1984 |
| DE | 35 45 660 | 6/1987 |
| DE | 37 43 292 | 6/1989 |
| DE | 42 24 728 | 1/1998 |
| DE | 197 52 187 | 6/1999 |
| DE | 102 31 028 | 2/2004 |
| EP | 0 204 397 | 12/1986 |

* cited by examiner

*Primary Examiner*—Michael Leslie
(74) *Attorney, Agent, or Firm*—Baker & Daniels LLP

(57) ABSTRACT

A hydrodynamic clutch having a pump and turbine and a case wherein a collection bath is provided underneath the case for the collection of work medium being discharged from the case vent openings and in which the case is immersed. There is in the collection bath at least one drainage opening with a drainage flange which is positioned above the floor of the collection bath with a predetermined clearance distance from the bottom. The case is immersed so far in the collection bath that it reaches into an area underneath the drainage flange.

23 Claims, 1 Drawing Sheet

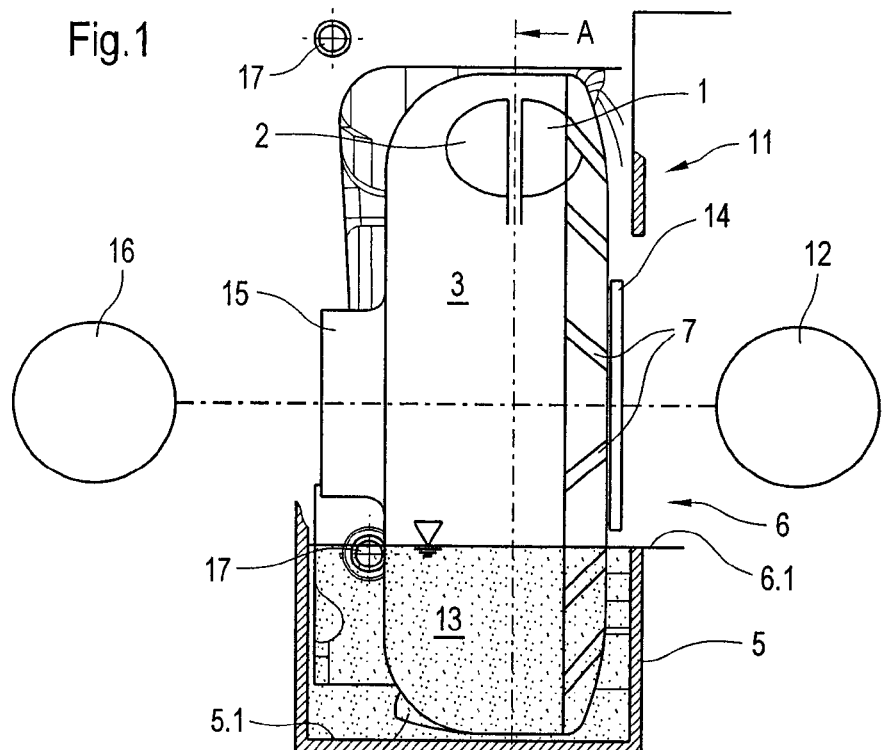
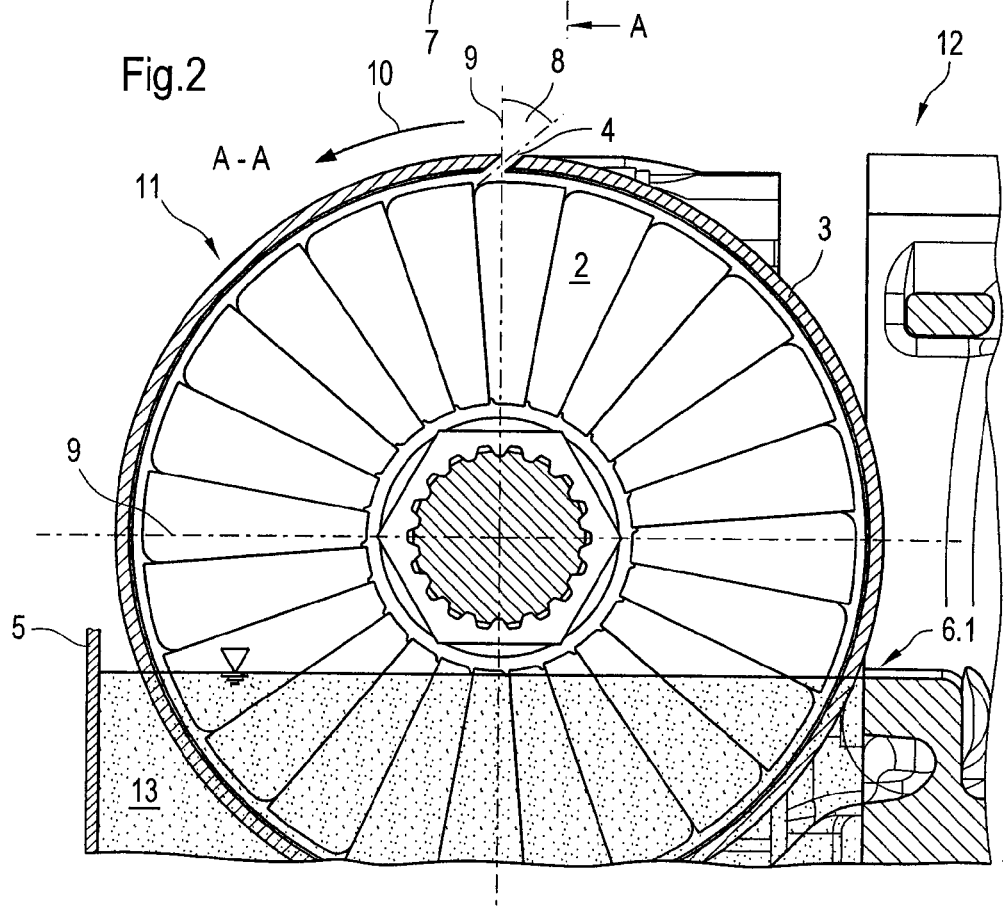

HYDRODYNAMIC CLUTCH

CROSS-REFERENCE TO RELATED APPLICATION

This application is related to and claims the benefit under 35 U.S.C. §119 and 35 U.S.C. §365 of International Application No. PCT/EP2005/012341, filed Nov. 18, 2005.

BACKGROUND OF THE INVENTION

The invention relates to a hydrodynamic clutch which can be inserted between a main engine and a drive engine and in particular a component group with a drive engine of a vehicle, an air compressor which can be powered by the drive engine and a hydrodynamic clutch designed to be in the drive connection between the drive engine and the air compressor.

Hydrodynamic clutches are known in a multitude of embodiments for differing purposes. A possible field of deployment for such hydrodynamic clutches is the transmission of torque, and/or general drive capacity from a drive engine of a vehicle to an air compressor, whereby the latter supplies the compressed air plant of the vehicle with compressed air. The advantage of the layout/design of a hydrodynamic clutch in such a power transmission is a cushioning of oscillation between the drive engine and/or a transmission which is connected in series to the drive engine and the air compressor which, as is generally known, is a consequence of the natural property of a hydrodynamic clutch. In this way, for example, it is avoided that in the actuation of a lifting piston in the area of the upper dead point of the piston a negative torque is transmitted back from the compressor onto the transmission which can lead to teeth-chattering and to excessive wear-and-tear in the transmission.

The patent application DE 32 33 567 A1 refers to an exemplary embodiment of a hydrodynamic clutch between a drive engine, here a diesel engine, and an air compressor, here a radial air compressor.

In many embodiments hydrodynamic clutches feature a clutch case which is partially designed with the pump wheel in such a way that the case during the operation of the hydrodynamic clutch rotates with the rotational speed of the input shaft. Thereby the pump wheel encloses, as a rule, together with a case part connected onto to it, the turbine wheel. Thereby the pump wheel and the turbine wheel are placed opposite one another in such a way that they form a mutual work chamber which can be filled with a work medium, for example oil, water or a mixture with one or both of these materials so that a torque, or for example general rotational power is transmitted from the pump wheel via the work medium onto the turbine wheel.

On account of the fact that the case of such a hydrodynamic clutch rotates the connection of a conduit to extract the work medium, through which the work medium can be "cleanly" extracted from the work chamber, is elaborate since appropriate rotating connections are required. Hence, as a rule and in practice, such clutches are laid out in such a way that the case features one or several vent openings out of which the work medium, which is discharged from the work chamber, sprays out. This work medium is collected, for example, as it sprays out, in a collection bath underneath the clutch casing and is led out of the collection bath via appropriate openings or piping.

In order to prevent a braking effect being exerted upon the hydrodynamic clutch, which leads to a deterioration in the degree of efficiency of the drive system, the collection bath is designed in such a way that in principle no oil sump and/or in general no accumulation of work medium can develop which could come into contact with the clutch case. This can be achieved either by the collection bath being designed to be at a sufficient distance from the clutch case or by appropriate drainage possibilities being created in the collection bath which would avoid any accumulation of work medium in it.

Furthermore it is known that in hydrodynamic clutches, on account of the slippage between the pump wheel and the turbine wheel, the work medium gets heated up during operation because of liquid friction. The major part of this heat is dissipated via the work medium flow rate. The flow rate of work medium is however dependent upon the pressure in the feed-line. When the revolution speed of the pump is low, and thereby also that of the turbine wheel, then only low feed-in pressure is available. Simultaneously there is great slippage between the pump wheel and the turbine wheel and a correspondingly great amount of heat output.

This unfavorable combination of low throughput by the hydrodynamic clutch together with simultaneously high liquid friction in the work chamber can lead to an impermissible increase in temperature in the hydrodynamic clutch.

In particular during the deployment of a hydrodynamic clutch in the drive connection between a drive engine, in particular a vehicle drive engine, and an air compressor there also arises the problem that, with an emptied or extensively emptied hydrodynamic clutch this will, via the compressor system, encourage a tendency to oscillation which is undesirable since it produces vibrations and noises.

SUMMARY OF THE INVENTION

It is the basic task of the invention to design a hydrodynamic clutch, and/or a component group with this sort of hydrodynamic clutch, in such a way that it avoids any impermissible heating up of the hydrodynamic clutch under all operation circumstances. Furthermore there should be submitted a procedure for the safe operation of a hydrodynamic clutch with reliable heat removal from the hydrodynamic clutch under all operational circumstances. According to an embodiment of the invention, at the same time undesirable oscillation, such as is described above, shall be avoided.

The task according to the invention is solved by a hydrodynamic clutch with the features of claim 1 and/or a component group incorporated therein and the operation thereof. The dependent claims describe advantageous and convenient embodiments of the invention. claim 7 as well as a procedure, such as is described in claim 10. The sub-claims describe advantageous and convenient embodiments of the invention.

According to the invention a part of the heat produced in the work chamber of the clutch is dissipated via the outer surface of the clutch case by liquid cooling. This is achieved by the fact that the case of the hydrodynamic clutch is immersed in such a way in a collection bath underneath the case for the collection of the work medium being discharged from the vent openings provided in the case so that at least under predetermined operational circumstances, advantageously under operational circumstances with high slippage between the pump wheel and the turbine wheel, at least the lower area of the case is situated in the work medium bath or in the work medium sump either of which has accumulated in the collection bath.

In particular in the case of a clutch case which is connected to the pump wheel and/or in such embodiments of the hydrodynamic clutch in which the pump wheel is designed as part of the case and thereby revolves around the case, whereby the entire peripheral surface of the case advantageously passes through the work medium bath and/or the work medium sump, in particular the oil sump if oil is being used as the work medium. There thereby takes place a liquid cooling of the outside surface of the clutch case whereby, by means of the rotational movement of the surface of the clutch case through the work medium bath, in contrast to a stationary immersion of the casing, the heat transfer from the surface onto the work medium bath is increased, In addition, the immersion of the case of the hydrodynamic clutch has the effect of cushioning the oscillation which, in a particularly simple and reliable manner, completely or substantially avoids the occurrence of oscillation, exemplarily in an emptied or extensively emptied hydrodynamic clutch.

According to an advantageous embodiment of the invention the case is not constantly immersed in the work medium sump and/or the work medium bath, but only under predetermined operational circumstances. These selected operational circumstances are preferably such operational circumstances in which the slippage between the pump wheel and the turbine wheel is large, exemplarily above 50 percent, which means that the pump wheel is running at twice the speed of the turbine wheel whereby such slippage conditions usually occur at low revolution speed in the clutch. Naturally other limitation levels can be selected for the slippage above which an immersion of the case in the work medium sump, in particular in the oil sump, in the collection bath is foreseen. Exemplarily there can be mentioned 60, 70, 80 or 90 percent.

By means of the immersion of the clutch case in the work medium accumulated in the collection bath with the clutch case at low revolution speeds the liquid cooling as per the invention takes place under the operational circumstances in which the heat production in the work space is high and the heat dispersal via the work medium throughput through the clutch is low. Simultaneously an immersion of the case at high revolution speeds at which the heat production in the clutch is comparatively small and the heat dispersal via the work medium throughput is high, is avoided so that no braking of the case and thereby the clutch, in particular of the pump wheel, takes place, which would have meant a deterioration of the degree of drive power.

The collection and partial or complete removal of the work medium sump in the collection bath can be provided via various design embodiments. According to a first embodiment the collection bath features at least one vent opening with a drainage flange which is designed with a predetermined clearance distance above the bottom of the of the collection bath. Thereby, on the one hand, the maximum height of the work medium sump in the collection bath is limited. On the other hand additional measures can be taken in order, under predetermined circumstances, to effect an emptying of the collection bath to a level below the drainage opening and/or the drainage flange.

According to a first measure the case of the hydrodynamic clutch features on its outside blade rows which "paddle" in the work medium which has accumulated in the collection bath. With increasing revolution speed of the clutch case this "paddling" becomes stronger and leads to a swashing out of the work medium through the vent openings and out of the collection bath. Thereby the level of the work medium surface in the collection bath sinks when more work medium is drained away from the collection bath than is being fed in via the hydrodynamic clutch. In particular, the level above a predetermined revolution speed sinks so dramatically that the case of the hydrodynamic clutch is no longer immersed in the work medium in the collection bath. At high revolution speeds an atomization of the work medium sump can be effected by the blade rows on the exterior of the case, whereby this mist can then either disperse or be extracted from the collection bath.

According to the second measure additional openings underneath at least one of the drainage openings can be provided with the drainage flange which can be deliberately opened after having previously been blocked. In this way the work medium can escape from the collection bath. The opening can exemplarily take place above a predetermined revolution speed of the hydrodynamic clutch, that means of the pump wheel, of the turbine wheel and/or of the case and/or below a predetermined slippage, exemplarily of 50 percent or less.

According to a third measure the work medium can, under predetermined operational circumstances, exemplarily under those operational circumstances which were described in connection with the second measure, be pumped out of the collection bath by using a pump.

All three measures can be executed individually, as a group or in combination.

All embodiments of the hydrodynamic clutch according to the invention feature a pump wheel and a turbine wheel, whereby the pump wheel and the turbine wheel form a work chamber with one another which can be filled with work medium for the transfer of a torque from the pump wheel onto the turbine wheel. The work medium can be oil, water or a mixture of both these materials and a further material with one or both of these materials. Furthermore a case is provided which features one or several vent openings for the drainage of work medium out of the work chamber whereby the work medium is fed out and/or sprayed out of the case via the vent opening(s).

Underneath the case there is a collection bath provided for the collection of the work medium being discharged out of the vent opening and/or the vent openings. Underneath, in the meaning of the invention, means that thereby the bottom of the collection bath is situated at a predetermined clearance distance underneath the bottom edge of the case. The case is immersed in the collection bath so that during the accumulation of work medium in the collection bath it extends down into the work medium.

According to the first embodiment of the invention the collection bath features at least a drainage opening with a drainage flange which is designed to be at a predetermined clearance distance above the bottom of the collection bath. Thereby the work medium begins to flow out of the collection bath through this drainage opening when the level of the work medium has reached the height of the drainage flange.

So that the level of the work medium can rise so far in the collection bath, far enough so that at least the lower area of the clutch case is immersed in the work medium accumulated in the collection bath, the drainage flange is designed to be at a geodetically higher location than the lower edge of the clutch case.

According to one particular embodiment the collection bath underneath the drainage flange is free from every kind of work medium drainage opening so that the formation of an accumulation of work medium can be guaranteed under the desired operational circumstances.

If the case has blade rows on its exterior and rotates at the revolution speed of the pump wheel, of the turbine wheel or at another predetermined speed, then these blade rows will, above a certain predetermined revolution speed, shovel more work medium out of the collection bath through the drainage opening and/or the drainage openings than is being fed in via the hydrodynamic clutch, so that the level of the work medium in the collection bath sinks. By contrast, at a lower revolution speed of the clutch case the blades on the exterior cannot attain an adequate shoveling effect so that the work medium accumulates in the collection bath up to the drainage flange or almost up to the drainage flange and exercises a correspondingly high cooling effect on the exterior of the case.

The hydrodynamic clutch, according to the invention, which includes the collection bath illustrated, with or without predetermined drainage flange in drainage openings, can be incorporated to particular advantage into the drive line between a drive engine of a vehicle and a drive engine powered by an air compressor. The design of a hydrodynamic clutch makes possible the switching on and off of the air compressor whereby simultaneously the transfer of torque from the compressor onto, for example, a transmission flange-mounted onto a drive engine, the output shaft of which is in effective connection with the pump wheel shaft of the clutch, is avoided. The drive engine is in particular designed as a fuel combustion power engine and the air compressor is in particular a reciprocating piston air compressor.

A component group in which the hydrodynamic clutch according to the invention, the drive engine of the vehicle and the air compressor are laid out, features to advantage a design which is such that the hydrodynamic clutch is designed to be flange-mounted onto the drive engine and/or connected to it, or is at least partially integral to it. The drainage flange of the drainage opening(s) of the collection bath can thereby be designed into the engine. Particularly advantageous is the fact that the work medium, which is in this case oil, is conveyed out of the collection bath via the drainage flange into the engine and/or flows into the engine when the oil level in the collection bath exceeds the level of the drainage flange and/or the shoveling effect of the exterior blades of the case is sufficiently high.

BRIEF DESCRIPTION OF THE DRAWINGS

The invention will be more closely described below with reference to an exemplary embodiment.

FIG. 1 shows a view from the side of a hydrodynamic clutch designed according to the invention;

FIG. 2 shows an axial section along the line A-A in FIG. 1.

In FIG. 1 can be recognized the hydrodynamic clutch 11, and in fact in particular the exterior surface of the case 3 as well as, in rudimentary form, the clutch input shaft 14 and the clutch output shaft 15. Furthermore the collection bath 5 is schematically illustrated, featuring a drainage flange 6.1 in a drainage opening 6. What is meant by drainage opening is the free space above the drainage flange 6.1 through which the work medium flows out of the work medium sump 13 when the liquid level of the work medium accumulated in the collection bath 5, as illustrated, reaches and exceeds the level of the drainage flange 6.1. In addition, above a predetermined revolution speed of the case 3 work medium can be swept along, out of the work medium sump 13, by the blade rows on the exterior of the case 3 and be transported out into the oil bath 5, exemplarily in the form of oil mist for which the work medium oil is whipped up by the blade rows 7 and which then runs off and/or is actively extracted, through the vent opening 6.

Alternatively the collection bath 5 can be provided on the inside with collection devices, for example in the form of grooves (not illustrated), which collect work medium which is flung by the blade rows 7 against the inside wall above the work medium level of the collection bath 5 and lead it out of the collection bath 5.

The collection bath 5 features a bottom 5.1 on which the work medium begins to accumulate after it has been discharged from the clutch 11.

As is very schematically illustrated in FIG. 1, the clutch input shaft 14 is in a drive connection with a vehicle drive engine 12 and the clutch output shaft is in a drive connection with an air compressor 16 which is in particular designed as a reciprocating air compressor. By filling the torus-shaped work chamber, which is formed by the pump wheel 1 and a turbine wheel 2 which is laid out inside the case and opposite to the pump wheel 1, torque and/or drive power is transferred from the pump wheel 1 onto the turbine wheel 2 and via the clutch output shaft 15, which is connected torsionally stiff to the turbine wheel 2 or is designed to be integral with this, further onto the compressor 16.

Although the collection bath in particular in FIG. 1 is schematically illustrated in the form of a bath designed as a single unit, this collection bath 5 can be developed via units of further components arranged adjacently to the hydrodynamic clutch 11, for example components of the vehicle drive line. In particular, as is shown in FIG. 2, the drainage flange 6.1 is designed as a unit of the vehicle drive engine 12.

In FIG. 2. in which is illustrated an axial section through the hydrodynamic clutch 11 between the pump wheel 1 and the turbine wheel 2 so that one recognizes the turbine wheel 2 in a frontal top view, one additionally exemplarily recognizes one of the multitude of vent openings 4 which are inserted into the outside wall of the case 3. The vent opening 4 which is an exemplary sample of a multitude of vent openings laid out over the entire extent of the case 3 is inclined at a predetermined angle 8 against the radial direction 9 of the case 3. The inclination is thereby designed in such a way that it is aligned in the opposite direction to the revolution direction of the case 3 which is illustrated by the arrow 10 when one observes the course of the vent opening 4 radially from inside to outside. This inclined alignment shown as being against the radial direction 9 has the advantage that on the one hand a complete emptying of the hydrodynamic clutch 11 is possible and on the other hand, during the emptying of the hydrodynamic clutch 11 through the vent openings 4 a rebound effect is produced which exercises drive power in the sense of revolution 10 onto the hydrodynamic clutch 11, which means at least onto the case 3 and possibly onto the pump wheel 1 of the hydrodynamic clutch 11 in the manner of a reaction propulsion.

In FIG. 2 one can additionally recognize that the hydrodynamic clutch 11 is flanged onto the engine 12. Since the engine 12, however, observed in the radial direction 9 of the hydrodynamic clutch 11, that is to say in the direction of the axial section illustrated in FIG. 2, features a greater width and also height than the hydrodynamic clutch, one recognizes parts of the engine 12 on the right and above the hydrodynamic clutch 11. In FIG. 1 there can additionally be recognized the positions 17 onto which the hydrodynamic clutch 11 is flanged onto the engine 12 from the side.

The invention claimed is:

1. Hydrodynamic clutch, comprising:
   a pump wheel;
   a turbine wheel;
   the pump wheel and the turbine wheel form together a work chamber which can be filled with work medium for the transmission of torque from the pump wheel onto the turbine wheel;
   a case including one or more vent openings for the discharge of work medium from the work chamber and the case; and a collection bath underneath the case for the collection from the one or more vent openings of discharged work medium in which the case is immersed, the collection bath including at least one drainage opening with a drainage flange which is positioned above a bottom of the collection bath with a predetermined clearance distance from the bottom;

the case being immersed so far into the collection bath that the case extends down into an area below the drainage flange.

2. The hydrodynamic clutch according to claim 1, wherein the pump wheel forms a part of the case.

3. The hydrodynamic clutch according to claim 1, wherein the case has blade rows on the outside.

4. The hydrodynamic clutch according to claim 1, wherein the collection bath is, below the drainage flange, free of work medium discharge openings.

5. The hydrodynamic clutch according to claim 1, wherein the drainage opening(s) is/are executed in the form of one or several drillings through the case which is/are installed in an inclined fashion at a predetermined angle to the radial direction of the case.

6. The hydrodynamic clutch according to claim 5, wherein at least one of the drillings, seen radially from inside to outside, against the revolution direction of the case, is inclined in an opposite direction to the revolution direction.

7. A component group including a vehicle drive engine and a hydrodynamic clutch according to claim 1 and in which the pump wheel has a drive connection with a drive shaft of the vehicle drive engine.

8. The component group according to claim 7, wherein the hydrodynamic clutch is connected to or is flanged onto the vehicle drive engine and the drainage flange is designed into the vehicle drive engine.

9. The component group according to claim 7, wherein the component group includes an air compressor a drive shaft of which has a drive connection with the turbine wheel.

10. A procedure for the operation of a hydrodynamic clutch with the following features of claim 1:
   a pump wheel;
   a turbine wheel;
   the pump wheel and the turbine wheel form together a work chamber which can be filled with work medium for the transmission of torque from the pump wheel onto the turbine wheel;
   a case including one or more vent openings for the discharge of work medium from the work chamber and the case;
   adjusting the inflow and outflow of work medium into a collection bath in such a way that the case of the clutch is immersed at least under predetermined operational circumstances in a work medium sump which is accumulated in the collection bath.

11. The procedure according to claim 10, wherein the predetermined operational circumstances include operating the clutch with a slippage between the pump wheel and the turbine wheel of more than 50 percent.

12. The procedure according to claim 10, wherein the case has blade rows on the outside and the blade rows on the outside of the case from a predetermined revolution speed of the case transport more work medium out of the work medium sump via at least one drainage opening than work medium which is being fed into the work medium sump so that the quantity of work medium in the work medium sump is decreased in such a way that the liquid level of the work medium sump sinks to a level underneath the case.

13. The procedure according to claim 10, wherein when there is a decrease to below predetermined slippage levels between the pump wheel and the turbine wheel and/or when there is an excess increase above the predetermined revolution speed of the pump wheel and/or of the case and/or of the turbine wheel, the liquid level of the work medium sump in the collection bath is lowered to a level which is beneath the case by means of opening at least one drainage opening in the collection bath or by pumping off work medium from the work medium sump.

14. The hydrodynamic clutch according to claim 2, wherein the case has blade rows on the outside.

15. The hydrodynamic clutch according to claim 2, wherein the collection bath is, below the drainage flange, free of work medium discharge openings.

16. The hydrodynamic clutch according to claim 3, wherein the collection bath is, below the drainage flange free of work medium discharge openings.

17. The hydrodynamic clutch according to claim 2, wherein the drainage opening(s) is/are executed in the form of one or several drillings through the casewhich is/are installed in an inclined fashion at a predetermined angle to the radial direction of the case.

18. The hydrodynamic clutch according to claim 3, wherein the drainage opening(s) is/are executed in the form of one or several drillings through the casewhich is/are installed in an inclined fashion at a predetermined angle to the radial direction of the case.

19. A component group including a vehicle drive engine and a hydrodynamic clutch according to claim 2 and in which the pump wheel has a drive connection with a drive shaft of the vehicle drive engine.

20. The hydrodynamic clutch of claim 1, wherein the collection bath is, below the drainage flange, free of every kind of opening.

21. The component of claim 9, wherein the compressor is an air compressor.

22. The hydrodynamic clutch of claim 2, wherein the collection bath is, below the drainage flange, free of every kind of opening.

23. The hydrodynamic clutch of claim 3, wherein the collection bath is, below the drainage flange, free of every kind of opening.

* * * * *